United States Patent

Shelby

[11] Patent Number: 5,953,146
[45] Date of Patent: Sep. 14, 1999

[54] METHOD AND APPARATUS FOR TRACKING ALIGNMENT IN WIRELESS OPTICAL COMMUNICATIONS

[75] Inventor: Kevin Alan Shelby, Scotch Plains, N.J.

[73] Assignee: AT&T Corp., New York, N.Y.

[21] Appl. No.: 08/791,279

[22] Filed: Jan. 30, 1997

[51] Int. Cl.[6] .................................................. H04B 10/10
[52] U.S. Cl. .......................................................... 359/159
[58] Field of Search ..................................... 359/159, 172, 359/189, 193

[56] References Cited

U.S. PATENT DOCUMENTS

| | | | |
|---|---|---|---|
| 4,491,982 | 1/1985 | Candy et al. | 359/159 |
| 5,343,287 | 8/1994 | Wilkins | 359/159 |
| 5,532,860 | 7/1996 | Hershey et al. | 359/159 |
| 5,539,562 | 7/1996 | Morioka et al. | 359/159 |
| 5,561,543 | 10/1996 | Ogawa | 359/159 |
| 5,594,580 | 1/1997 | Sakanaka et al. | 359/159 |
| 5,644,126 | 7/1997 | Ogawa | 359/142 |
| 5,773,808 | 6/1998 | Laser | 235/462 |

*Primary Examiner*—Leslie Pascal

[57] ABSTRACT

An optical communication system and methods are disclosed wherein the receiving source uses an array sensor to recover data from a transmitted optical beam and to evaluate alignment accuracy with the transmitted beam. The array sensor uses the principles of geometric invariance to determine the accuracy of alignment. The sensor may relay the recovered information to a system controller or other suitable device, which can then reposition the receiver so that it is properly aligned with the transmitter. The system and methods advantageously provide for a more compact and robust communication system wherein a single receiving element can be used for both data recovery and alignment evaluation functions.

23 Claims, 4 Drawing Sheets

METHOD AND APPARATUS FOR TRACKING ALIGNMENT IN WIRELESS OPTICAL COMMUNICATIONS

BACKGROUND OF THE INVENTION

This invention relates to optical communications, and more particularly to a method and apparatus for tracking alignment in optical communications systems.

Optically-based wireless transceiver systems have provided revolutionary advancements in the field of communications. Such systems have become increasingly prevalent and have been implemented for many practical applications. For example, optical communications are used for data gathering functions such as video-conferencing, E-mail, fax, television, digital radio communications, and a variety of networking applications. The popularity of optical systems can be attributed to their numerous beneficial characteristics. Optical systems are wireless; thus, physical installation is relatively simple. Noise and interference problems associated with other types of wireless communications have largely been eliminated with the advent of optical systems. The total power consumption for most optical systems is comparably low. These and other benefits have made wireless optics an increasingly popular communication technique.

One shortcoming of existing wireless optical systems is the requirement that the transmitting source be properly aligned with the receiving source. Without proper alignment, the optical receiver cannot effectively evaluate the optical beam to perform data recovery. The problem is exacerbated where substantial electrical noise in the environment interferes with the optical receiver. Such interference may falsely trigger the system to recognize an optical beam when none was in fact transmitted. In contrast, systems using hardware connections, such as fiber optics systems, do not require transmitter-receiver alignment. The transmitted wave simply follows the contour of the wire or other transmission media until it reaches the receiver.

Nevertheless, a wireless optical receiving system having a very efficient correction mechanism would minimize alignment problems while preserving the remaining substantial benefits associated with wireless optical communications.

Also, for maximum efficiency, it is desirable to implement an optical system which can effectively process a low-energy optical beam. Having such a system, low power optical signals can be transmitted and decoded at the receiving end such that a minimum amount of energy is expended in the process.

To perform these tasks, an optical communication system must be capable of automatically realigning the transmitter and receiver which, for whatever reason, have become misaligned. Unfortunately, current technology requires that multiple receiving elements be used for receiver realignment and data gathering. The use of multiple elements, among other things, increases cost and power consumption while decreasing overall system efficiency.

As an illustration, one prior art optical receiving communication system uses a separate quadrant sensor, positioned in the line-of-sight of the optical transmitter, to detect and correct alignment errors. The system also uses a collecting lens to project the received beam onto a photodiode for data recovery. Disadvantageously, this approach requires at least three distinct elements (a quadrant sensor, a collecting lens, and a photodiode) to implement the system's optical receiver. Thus, multiple optical receiving elements are required to implement data recovery and directional accuracy tracking, which complicates and increases the cost of the receiving system. Another disadvantage of this system is its inefficient use of transmitted optical power. In particular, after evaluating the alignment accuracy of the transmitted beam, the quad sensor must then permit photons of the beam to pass through the sensor to a second apparatus (collecting lens and photodiode) for data recovery. The transmitted beam must contain sufficient signal power to enable the beam to pass enough photons to the photodiode through a small aperture in the quad sensor. This prior art configuration places practical limits on the minimum achievable transmitted signal power. While further drawbacks to this prior art approach are omitted from discussion, they will be apparent to practitioners in the art.

It is therefore an object of the invention to provide a more simplified, compact and robust method and apparatus for processing received optical signals.

It is still another object of the invention to provide a method and apparatus for using a single optical receiving element to perform both data recovery functions and tracking accuracy evaluations.

It is further an object of the invention to provide a more efficient optical communication system which requires less power consumption than existing systems.

SUMMARY OF THE INVENTION

These and other objects of the invention are accomplished in accordance with the principles of the invention by providing a method and apparatus which uses a single array sensor to receive transmitted data and to determine tracking accuracy. The array sensor, which is the principle data recovery mechanism, receives an optical beam from a transmitting source such that a projected image of the received beam is captured on the array. The projected image is compared with a predetermined image to determine tracking accuracy of the received beam. Deviations between the projected image and the predetermined image alert the system that a tracking error has occurred, and corrective action to realign the receiver with the transmitter may be initiated based on the error.

Further features of the invention, its nature and various advantages, will be more apparent from the accompanying drawings and the following detailed description of the preferred embodiments.

BRIEF DESCRIPTION OF THE DRAWINGS

FIG. 1b is a front view of a prior art quad sensor used in the optical communication system of FIG. 1a.

DETAILED DESCRIPTION OF THE PREFERRED EMBODIMENTS

Figure 1A:
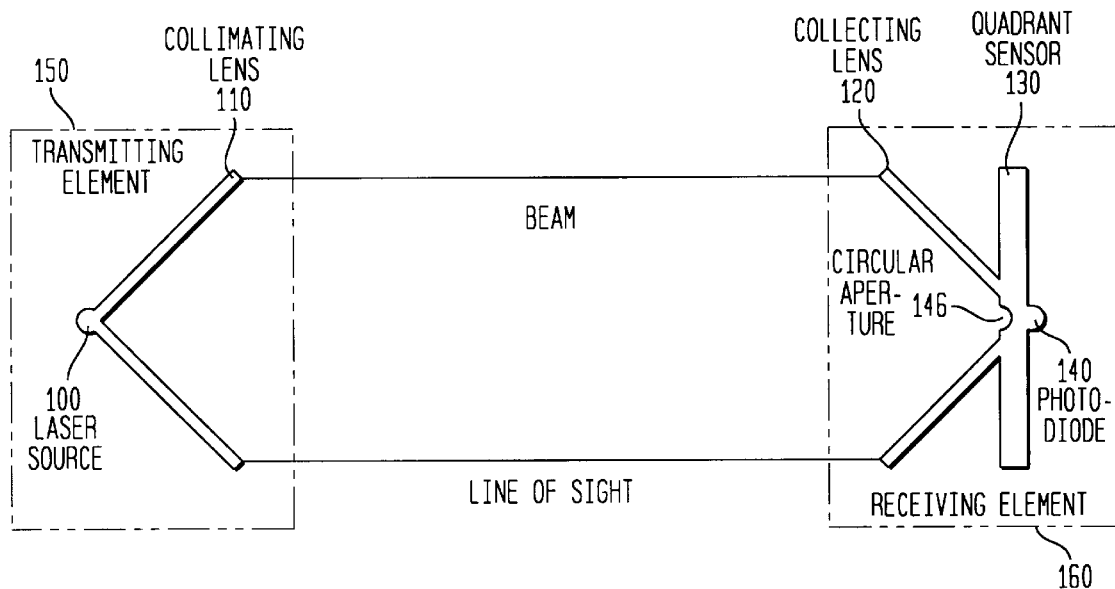
FIG. 1a is a simplified representation of an illustrative prior art optical communication system.

FIG. 1a depicts a prior art system for receiving optical communications. The system is generally characterized by two transceiver stations positioned at some spatial distance from each other. One transceiver station comprises a transmitting element 150, which includes laser source 100 and collimating lens 110. The collimating lens 110 produces a circular projection of the transmitted beam. The other transceiver station comprises a receiving element 160, which includes photodiode 140 and collecting lens 120. An optical beam is transmitted from laser source 100 in the line of sight of receiving element 160. Collecting lens 120 deflects the impacting beam into photodiode 140 for further processing. Photons residing in the optical beam are used to transmit digital information to receiving element 160. Photodiode 140 measures characteristics of photons from the beam. Such measurements are used to recover information conveyed from transmitting element 150 to receiving element 160. Typically, the presence or absence of a beam in a given time slot signifies either a logic zero or a logic one.

Figure 1B:
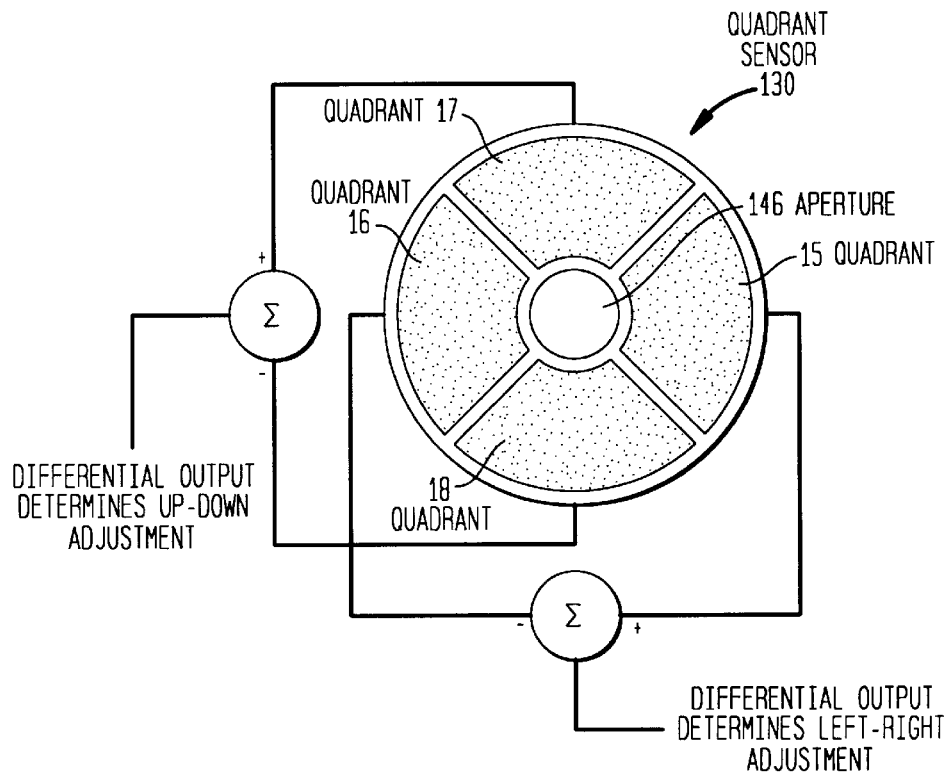

To effectuate reliable data recovery, proper alignment is required between transmitting element 150 and receiving element 160. Practitioners have conventionally deployed a quadrant sensor ("quad" sensor) 130 for this purpose. FIG. 1b is an orthogonal view of the quad sensor 130 of FIG. 1a, which shows the circular aperture 146 into which the optical beam passes through sensor 130 to contact photodiode 140. Quad sensor 130 relies on four spatial quadrants, 15, 16, 17 and 18, to determine whether receiving element 160 (i.e., the collecting lens 120 and photodiode 140 of FIG. 1a) is properly aligned with laser source 100 such that a precise transmission of the optical beam is effected.

The impacting photons created by the optical beam cause charge to accumulate on the four spatial quadrants 15, 16, 17, and 18 of quad sensor 130 (FIG. 1b). The optical system periodically measures the relative difference in charge concentration between diametrically opposed quadrants. For vertical alignment adjustments, the difference between the respective charge concentrations in quadrants 17 and 18 is measured. Similarly, for horizontal alignment adjustments, the difference between the respective charge concentrations in quadrants 15 and 16 is measured. These differences in accumulated charge between two quadrants are called the differential outputs. Where the differential outputs are zero, the charge concentration is uniform throughout the four quadrants, which indicates that receiving element 160 is properly aligned with laser source 100.

In the normal course of operation, the optical system periodically measures the two differential outputs. Based on these periodic measurements, the system intermittently realigns the receiving element 160 so as to maintain the value of the differential outputs near zero. For quadrants 17 and 18, the magnitude of the differential output governs the magnitude of vertical adjustment of receiving element 160 required to restore proper alignment with the transmitted beam. Similarly, the differential output measured from quadrants 15 and 16 controls the required magnitude of horizontal adjustment. The differential output may be positive or negative depending on the frame of reference chosen for the measurements. Whether the differential output is positive or negative determines the direction of the required adjustment (i.e., left or right for horizontal measurements; up or down for vertical measurements).

In the exemplary quad sensor of FIG. 1b, quadrant 17 is given a positive frame of reference relative to quadrant 18, and quadrant 15 is given a positive frame of reference relative to quadrant 16. If the concentration of charge in quadrant 17 is greater than in quadrant 18, the system will measure a positive differential output. This signifies that an upward vertical adjustment to the receiving element 160 is necessary. The amount of realignment needed is proportional to the magnitude of the differential output obtained from quadrants 17 and 18.

Horizontal alignment is accomplished in a similar manner. The system measures the difference between the concentration of charge in respective quadrants 15 and 16. If, for instance, the measured concentration of photons in quadrant 16 is greater than that of quadrant 15, a negative differential output is obtained, which means that a receiver adjustment to the left is necessary. The amount of horizontal receiver adjustment is directly proportional to the differential output obtained from quadrants 15 and 16.

Based on the respective differential outputs obtained from the two pairs of quadrants, the optical communication system will actuate realignment using some known method such as with physical actuators. While the system realigns the receiving element 160 with the transmitting element 150, photodiode 140 continues data recovery by sensing either the existence or absence of photons from the transmitted optical beam. The data recovery method relies on photons which are passed through quad sensor 130 via aperture 146 onto photodiode 140.

As previously explained, the communication technique of FIGS. 1a and 1b requires the use of multiple optical receiving elements to perform the dual tasks of alignment tracking and data recovery. Because the beam must be processed by a quad sensor, and then passed through to the collecting lens for further processing, the use of multiple elements results in a less efficient use of the transmitted power. Using multiple elements also results in an optical communication system which is bulkier, more difficult to deploy in environments having limited space, more costly due to additional power consumption and the added expense of the individual elements, and less immune to spurious electrical interference. Additionally, where multiple elements work concurrently to provide both the necessary tracking alignment and data recovery functions, tracking alignment can be a particularly slow process. The quad sensor can also produce alignment errors where identical misalignments occur in the right and left quadrants and the up and down quadrants, respectively.

Figure 2A:
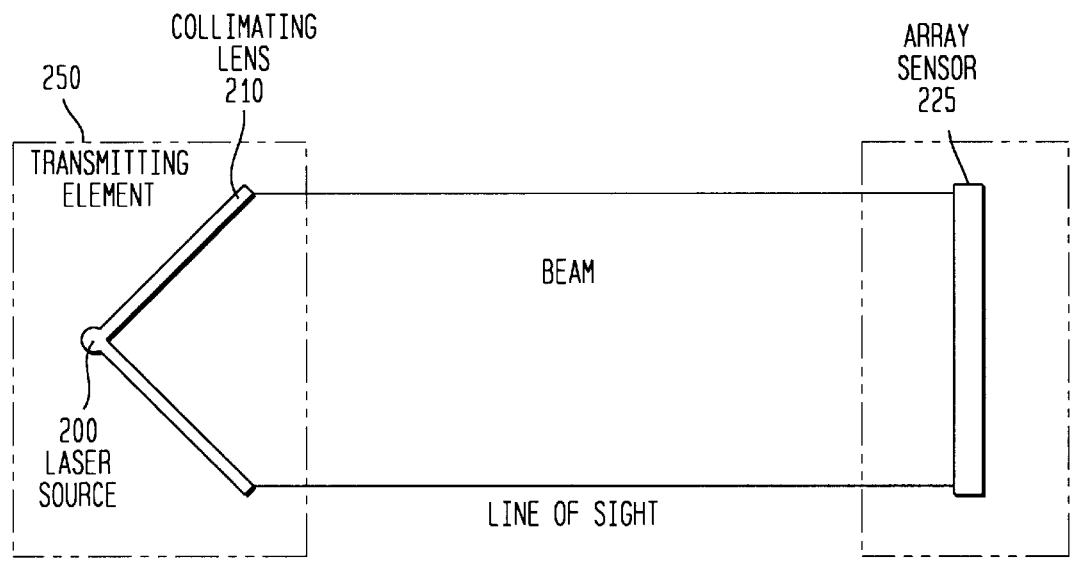
FIG. 2a is a simplified representation of an illustrative embodiment of an optical communication system using a single array sensor, in accordance with the present invention.

The present invention, described below in the context of the inventor's presently preferred embodiments, provides both a more compact approach to optical communications and a more efficient, unitary use of transmitted power. Referring to FIG. 2a, a preferred transceiver arrangement is shown in accordance with the present invention. A laser source 200 and a collimating lens 210 comprises the transmitting element 250. Source 200 sends an optical beam using collimating lens 210 to circularize the image. A single array sensor 225 comprises the receiving element. Array sensor 225 generally comprises an array of light gathering devices. Although it may comprise any suitable light-gathering device, array sensor 225 preferably comprises an array of photodiodes arranged in rows and columns. Where photodiodes are used as the light-gathering mechanism, each photodiode is considered to comprise an individual pixel on array sensor 225. The output of each photo diode is typically coupled to an electronic control mechanism, the details of which are not critical to an understanding of the invention. The photodiodes comprising each pixel are used to detect the presence or absence of photons residing in an impacting beam. This information, in turn, is used to establish the existence and shape of a transmitted optical beam in a manner to be described below.

Unlike prior art systems wherein a collecting lens 120 is required (see FIG. 1a), a collecting lens need not be used in the present invention. The optical beam instead strikes array sensor 225 directly, causing the image created from the laser source 200 to be collimated directly on sensor 225. The system may then make alignment measurements and extract data by evaluating the image illuminated on the array sensor 225.

Figure 2B:
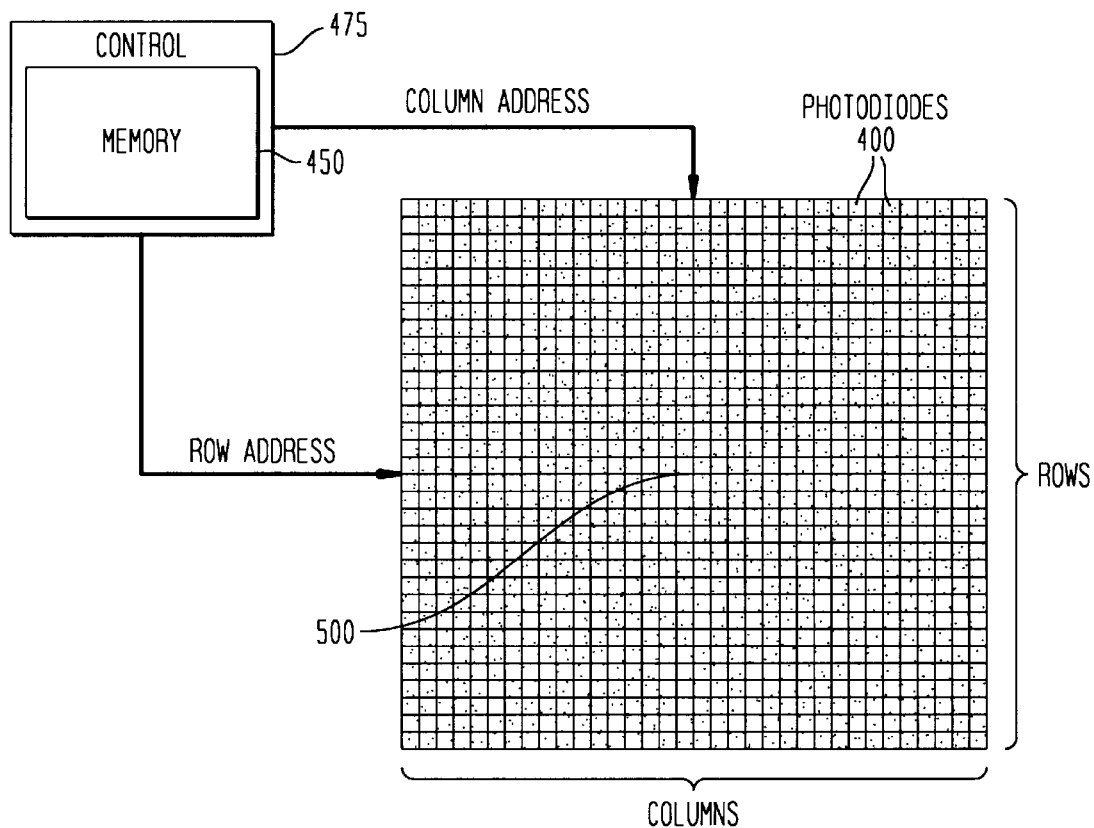
FIG. 2b is a view of an array of light gathering devices comprising the array sensor of FIG. 2A.

FIG. 2b is an illustrative view of the surface of array sensor 225, having a plurality of photodiodes 400 arranged in rows and columns as in some embodiments of the invention. In these embodiments, control system 475 has a row address and a column address dedicated for each respective row and column of the array. By referencing a particular row address and column address, control system 475 can read the output of photodiode on the array. The row and column addresses can be stored in a memory 450 in control system 475. In the illustration of FIG. 2b, control system 475 is referencing a particular row address and column address to read the output at photodiode 500 on the array.

Figure 2C:
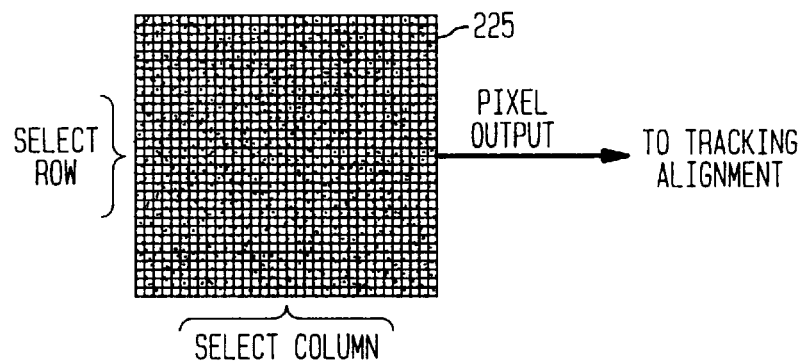
FIG. 2c is an orthogonal view of the array sensor of FIG. 2A.

FIG. 2c shows an orthogonal view of array sensor 225 in a flat rectangular form. However, alternative shapes of array sensor 225 may be contemplated.

Data recovery may beneficially be performed concurrently with the alignment analysis using the same array sensor 225. In a preferred embodiment, discrete time slots exist wherein each time slot corresponds to a specific digital value, i.e., a logic one or a logic zero. In this embodiment, the transmission of a beam in a time slot indicates the existence of a logic one. Conversely, the absence of transmission in a time slot indicates the existence of a logic zero. Data is accordingly recovered as one digital bit per time slot. When a beam is transmitted from laser source 200 (FIG. 2a), the existence of photons striking sensor 225 delineates the areas of impact which, in turn, establishes the shape of the beam. The beam may be used for alignment evaluations (see below). The impact of the photons on sensor 225 also enables the system to extract data sent by the beam. Data may be recovered by adding, for each time slot, the net number of pixels on sensor 225 which have been 25 impacted by photons from the optical beam. Using this summing procedure, the transmitted information is collected for communication to a central controller or other designated location. The system controller then processes this information offline to perform data recovery and tracking alignment functions. As such, the single array sensor 225 advantageously performs the dual functions of data recovery and tracking alignment.

A preferred embodiment of the data recovery technique of the present invention uses a CMOS image sensor as the array sensor 225. A CMOS image sensor comprises a plurality of photodiodes arranged in row and column format, like the array depicted in FIG. 2b. Each photodiode comprises an individual pixel of array sensor 225. One advantage of using a CMOS image sensor 225 over other devices, such as a charge-coupled device (CCD), is that it may read the output at individual pixels, thereby significantly increasing data recovery times. Specifically, for each time slot, the image sensor 225 measures the number of photons impacting each pixel located on array sensor 225 as follows. The system control mechanism preferably comprises a memory which stores row and column addresses as described above. The system controller addresses each pixel by selecting a particular row address and column address. Using these row and column addresses, the system controller reads the contents at each pixel output. The digital value of the pixel output will depend on the amount of photons which have impacted that pixel during a particular time slot. In the case where a beam has been transmitted in that time slot, the photon concentration at each photodiode will be high. Conversely, where no beam has been sent, the photon concentration at each photodiode will be markedly lower. Thus some threshold quantity of photon concentration exists below which the output of the photodiode will have a first digital value, and above which it will have a second digital value. Where a high concentration of photons on a photodiode (indicating the presence of a beam) yields a second digital value at that pixel's output, the system controller will flag that pixel. Alternatively, where a lower concentration of photons on a photodiode yields a first digital value, the pixel is not flagged. The use of a CMOS image sensor in this context has at least two advantages: (1) pixels not impacted by the optical beam are eliminated from the subsequent summing step (see below); and (2) pixels which have been impacted by spurious electrical noise, but which have not been impacted by the optical beam will not meet the photodiode threshold (if the threshold is chosen properly), and likewise are not considered for summation.

Next, the summing procedure described above is employed wherein the number of flagged pixels are summed by a system controller. If the sum total of flagged pixels surpasses a second predetermined threshold number, the system concludes that an optical beam has been transmitted (as opposed to either no transmission or mere electrical interference without a transmission), and accordingly assigns a digital one for that time slot. Conversely, if the sum total of flagged pixels does not exceed the predetermined threshold number, the system determines that no optical transmission has occurred and assigns a digital zero for that time slot. This summing procedure may occur for any number of time slots, and a string of digital information is obtained from the transmitting element 210. Of course, the digital values may be reversed, where the presence of a beam instead yields a digital zero, etc.

The system controller may also record in memory the distribution of impacted pixels for alignment measurements (see below). In some embodiments, such information is stored only where the sum total of impacted pixels meets or exceeds the predetermined threshold number.

This preferred data recovery method using a CMOS image sensor has distinct advantages. First, image sensor 260 significantly increases the rate of data recovery as compared with previous methods. For example, conventional data recovery devices, such as Charge Coupled Devices (CCD) used in instruments like camcorders, necessitates reading the entire pixel array before evaluating individual pixels. This procedure results in comparably long data recovery times. In contrast, CMOS image sensor 160 provides for the reading of individual pixels without requiring an assessment of the entire array. Moreover, unlike a system using a CCD, only those pixels selected by image sensor 160 need be considered by the system controller. The remaining pixels are simply discounted from the summing step. Hence, the computation time relating to the summing procedure is considerably faster than if all pixels were summed. Using such a device, data recovery rates of 1 Gbps or greater can be achieved. This data recovery time is comparable to, or better than, optical communication techniques which employ a quad sensor.

The use of a CMOS image sensor provides further benefits in terms of resistance to noise. Spurious electrical transmissions which trigger minimal photon activity on a given pixel are readily discounted by the image sensor. Thus the effect of noise is minimized, and more accurate data measurements are obtained.

The above illustrations, and each of the above techniques, represents the preferred method of implementing data recovery using array sensor 225. Other equally suitable techniques and variations may be contemplated by those skilled in the art after perusal of this disclosure.

For alignment measurements, the transmitted optical beam impacts the array sensor 225, and thereby illuminates an image on sensor 225. The preferred method of reading the individual pixel outputs, described above, is likewise used by the system in determining the shape of a transmitted beam for performing tracking alignment. In particular, the system determines the shape of an impacting beam by evaluating the number and position of pixels which have been impacted by photons. Preferably, information relating to the distribution of impacted pixels (which establishes the shape of the impacted image) is placed in a memory to await further processing. The system compares this illuminated image with a predetermined image to determine whether deviations exist between the two. The presence of deviations indicates that corrective measures need be taken to align the transmitter and receiver. The magnitude and direction of the corrective measures are proportional to the magnitude of deviation of the illuminated image from the predetermined image.

Advantageously, the information obtained during the data recovery process, and specifically the information obtained from image sensor 260 about each pixel, may also be used to measure alignment accuracy. For instance, the shape of the projected image onto sensor 225 is determined based on the distribution of impacting photons on array sensor 225 as described above. The shape of this image yields important information about alignment accuracy (see below).

Array sensor 225 determines whether a misalignment exists between itself and transmitting element 250. This determination is made without the need for additional alignment detection structures. Upon determining alignment errors, sensor 225 provides necessary information to a system controller or other source. Using this information, the system may make corrective measures to promptly restore proper alignment for the continued and accurate reception of transmitted data.

The realignment mechanism of the present invention relies in part on the known principle of geometric invariance under perspective transformation. This principle decrees that a projected circle will image as a circle, but only if the image is projected orthogonally (that is, perpendicularly) relative to the screen. In all other cases, the projected circle will image as an ellipse. Thus, where a circular beam from a transmitting source is projected under circumstances where the transmitter is not perfectly aligned with the receiver, the image will consequently appear as an ellipse to the transmitting source. Further, the specific contour of the ellipse beneficially conveys information relating to the nature and extent of the misalignment.

Applying this principle to the present invention, orthogonal alignment between transmitting element 250 and array sensor 225 results in the collimated beam imaging as a circle onto sensor 225. Thus, where sensor 225 perceives a circle being imaged onto it (e.g., using the CMOS image sensor technique), alignment is deemed correct, no corrective action is taken, and data recovery commences as usual.

Where the projected image instead appears as an ellipse, the system concludes that a misalignment exists between transmitter and receiver. The degree of divergence from a circular shape and the shape of the projected image provides the system with information relating to the direction and extent of misalignment. Using this information, the system may adjust the alignment of the sensor 225 in a manner proportional to the magnitude and direction of the misalignment of the optical beam. Thus, the simple projection of the imaged beam onto receiving sensor 225 enables the system to take corrective measures in response to deviations in alignment.

Associated with the array sensor, and contained within the system, is a predetermined image for comparison with the image impacting array sensor. Where a circular beam is projected, for example, the predetermined image will be a circle. Other geometries are intended to be within the scope of the invention.

Figure 3:
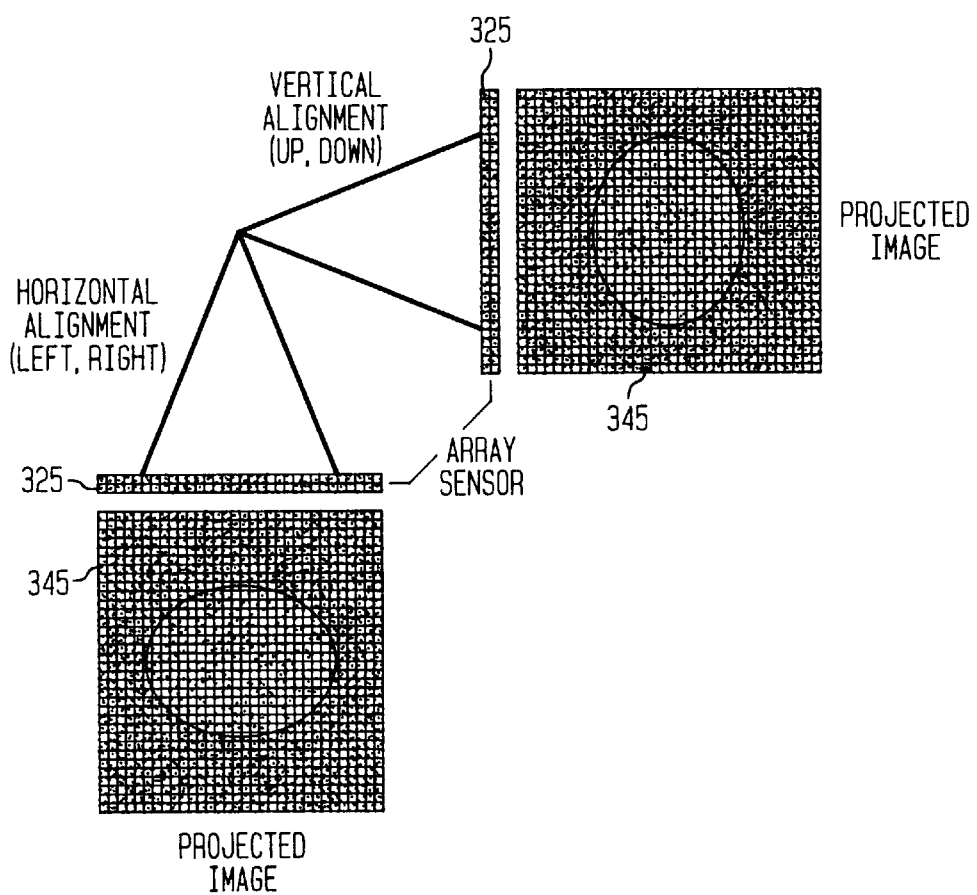
FIG. 3 is a simplified representation of an illustrative alignment tracking technique in accordance with a preferred embodiment of the present invention.

FIG. 3 is a conceptual diagram which illustrates the use of geometric invariance on projected images. The image projected onto array sensor 325 is examined, and the extent to which the image deviates from a circle is determined in both horizontal and vertical directions. Boxes 345 represent orthogonal views of array sensor 325. Ensuing alignment corrections by the system are proportional to the magnitudes of horizontal and vertical deviations from the circular shape. In some embodiments, physical actuators are used to realign the receiver with the transmitter.

Figure 4:
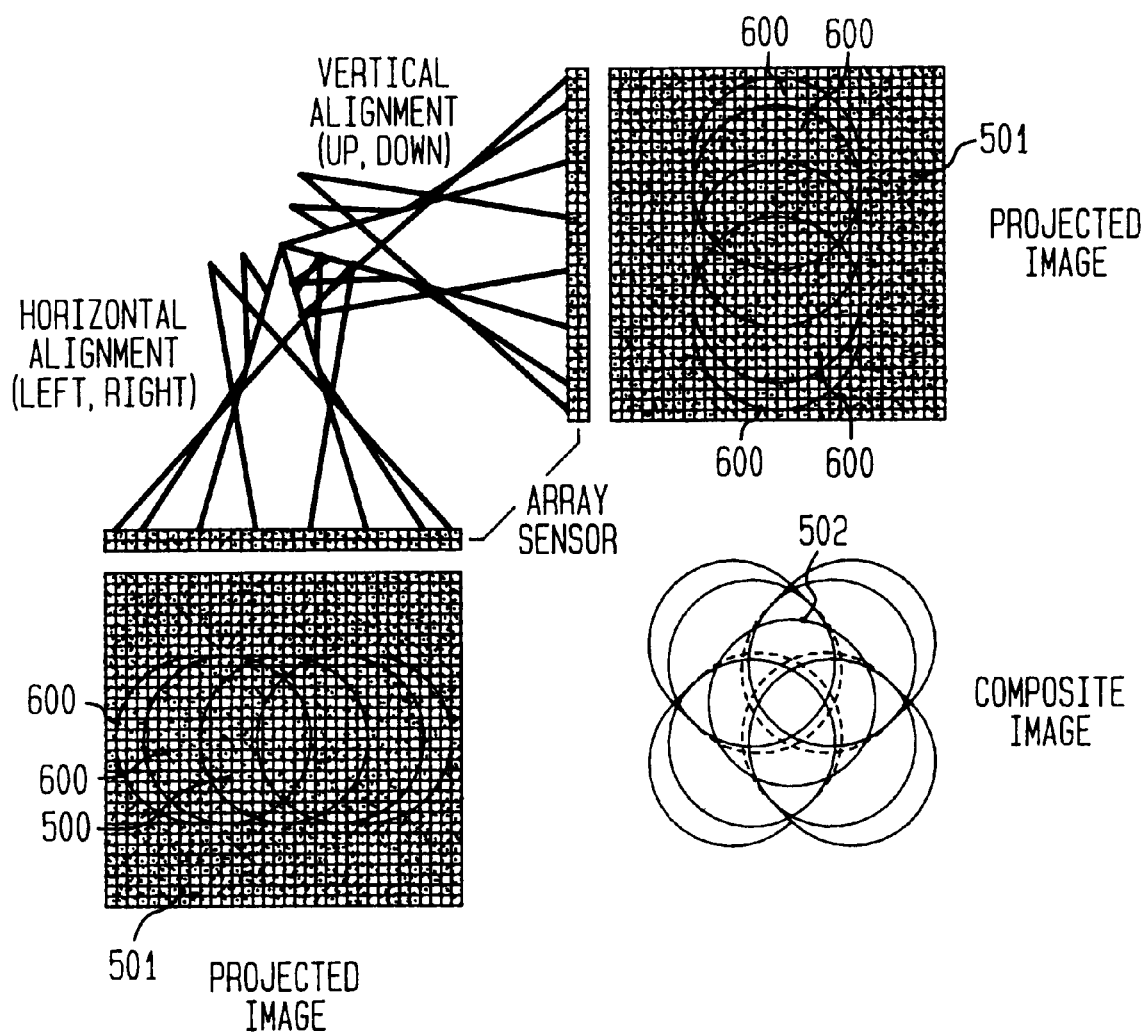
FIG. 4 is a conceptual diagram which illustrates geometric invariance with respect to several projected images of varying magnitude and direction.

FIG. 4 is a conceptual diagram which illustrates geometric invariance with respect to several projected images of varying magnitude and direction. The circles labeled 501 represent an instance in time where the transmitting and receiving elements are perfectly aligned. In this case, the composite image will result in circle 502, in which event no realignment need be effectuated by the system. The other circles 600 comprising the vertical and horizontal projected image are displaced from the center of the array sensor. As such, each pair of those images (one vertical and one horizontal) represent individual instances in time where alignment is imperfect. Depending on the magnitude and direction of the misalignment, the composite image will appear as an ellipse rotated on a diagonal. The extent and direction of misalignment are proportional to the degree of rotation of the composite image. In response to the shape and degree of rotation of the composite image, the system can then take corrective action to realign the receiving element with the transmitting element.

Ambiguities of sensor 225 in interpreting alignment are resolved at the outset by properly calibrating the system upon installation. Initial calibration is necessary to avoid misalignment of the image by an identical amount to the left and right of the projected image, which would otherwise produce alignment errors due to the similarity of produced right and left images. Likewise, initial calibration solves the problem which occurs when misalignment by an equal amount up and down results in similar ellipses causing similar images which would otherwise produces ambiguities in alignment. Initial system calibration enables the misaligned image to be projected onto a different quadrant of the array sensor such that left-versus-right or up-versus-down misplacements are vividly distinguishable. Thus, in the initial installation, the rough location of the source is preferably ascertained, and a center is established relative to the communication system. Based on this initial centering, the system can evaluate the resulting ellipse to determine the true amount of displacement, and accordingly make alignment corrections.

In addition to projecting the beam as a circle, other shapes may be contemplated. The principle of geometric invariance dictates that a non-orthogonal projection of a beam having a predetermined shape will result in the beam impacting a source with a different shape. Thus, for example, the practitioner may choose to shape the beam as a rectangle, and then use the principles of geometric invariance and the present invention to ascertain the extent of misalignment at the receiving end, making appropriate corrections.

It will be understood that the foregoing is merely illustrative of the principles of the invention, and that various modifications can be made by those skilled in the art without departing from the scope and spirit of the invention. All such variations and modifications are intended to fall within the scope of the claims appended below.

What is claimed is:

1. An optical communications system comprising:
   a transmitting element; and
   a receiving element, said receiving element comprising a CMOS image sensor array for determining tracking accuracy of an optical beam transmitted from said transmitting element and for detecting data, said data comprising bits per time slot, each bit being detected as a number of photons per pixel, the number of photons per pixel being recorded as a digital bit when the number of photons exceeds a predetermined threshold.

2. The system of claim 1, further comprising a system controller for summing the number of pixels recording a digital bit.

3. An optical communication receiving system for tracking beam alignment, comprising:
   an array sensor for receiving an optical beam from a transmitting source, wherein the system compares a planar shape of an illuminated image on said array sensor created by the impact of said optical beam, with a planar shape of a predetermined image, and wherein the system initiates corrective alignment between the transmitting source and said array sensor upon detecting a deviation in only one of two dimensions between the shape of said image and the shape of said predetermined image.

4. The system of claim 3, wherein the planar shape of said predetermined image comprises a circle and the planar shape of said illuminated image comprises an ellipse.

5. The system of claim 3, wherein the magnitude of the corrective alignment is proportional to the magnitude of said deviation in only one of two dimensions between the shape of said image and the planar shape of said predetermined image.

6. The system of claim 3, wherein data is transmitted from the transmitting source to said array sensor by selectively actuating the optical beam over a plurality of time slots for concurrent beam tracking and data recovery, the system recording digital data during each time slot based on the transmission or absence of transmission of the optical beam during said each time slot.

7. The receiving system of claim 3, wherein said array sensor comprises an image sensor comprising an array of photodiodes for sensing the presence or absence of a transmitted beam.

8. The receiving system of claim 7, wherein data is communicated over a plurality of time slots by the impact or lack of impact of the optical beam onto said array sensor for concurrent beam tracking and data recovery, wherein the system sums for each time slot the number of pixels on said array sensor impacted by the beam, the impact of the beam onto a pixel being represented by a first data value and the absence of impact being represented by a second data value.

9. The receiving system of claim 3 wherein said sensor comprises a CMOS image sensor array.

10. An optical communications system for evaluating alignment accuracy, comprising:
    a transmitter comprising a laser source for transmitting an optical beam; and
    a receiver comprising an array sensor which receives the optical beam, the optical beam impacting said array sensor, an image having a two dimensional shape being formed on said array sensor by the impact of the optical beam, the elongated shape of the formed image in comparison with a predetermined two dimensional shape being used to determine whether said array sensor is aligned with said transmitter.

11. The system of claim 10, wherein said array sensor comprises an image sensor for detecting the presence or absence of a transmitted beam.

12. The system of claim 10, wherein said array sensor recovers data based on the presence or absence of a transmitted beam.

13. An optical receiving element comprising an array sensor comprising an array of light gathering devices, said receiving element used to recover data based on the presence or absence of an optical beam impacting said array sensor, and said receiving element used to concurrently measure alignment errors based on the elongated nature of the two dimensional shape of an impacting optical beam in comparison with a predetermined two dimensional shape.

14. The receiving element of claim 13 wherein said receiving element comprises a CMOS image sensor.

15. A method for tracking alignment using an optical communication system, comprising the steps of:
    receiving an optical beam from a transmitting source by impacting the optical beam onto an array;
    comparing a two dimensional shape of the impacted image with a two dimensional shape of the predetermined image;
    determining whether a deviation in one of said two dimensions of said two dimensional shape exists between the shapes of the respective images; and
    initiating corrective alignment based on a direction and extent of a deviation between the shapes of the respective images.

16. The method of claim 15, further comprising the step of detecting data over a plurality of time slots based on the presence or absence of an impacting beam during each time slot.

17. The method of claim 16, wherein said comparing step further comprises the step of creating a projected image in the horizontal and vertical directions, and combining said horizontal and vertical images to create a composite image.

18. The method of claim 15, wherein said comparing step further comprises the steps of:
    summing the pixels on said array sensor which have been impacted by the beam;
    comparing the sum with a predetermined threshold number; and
    recording the distribution of impacted pixels into a memory where the sum meets or exceeds the threshold number.

19. The method of claim 17, wherein said summing step includes the initial step of recording digital values at the output of each individual pixel.

20. An optical communication receiving system for tracking beam alignment, comprising:
    an array sensor for receiving an optical beam from a transmitting source comprising an array of photodiodes for sensing the presence or absence of pulses, wherein the system compares a shape of an illuminated image on said array sensor created by the impact of said optical beam with a shape of a predetermined image, and wherein the system initiates corrective alignment between the transmitting source and said array sensor upon detecting a deviation between the shape of said image and the shape of said predetermined image, wherein data is communicated over a plurality of time slots by the impact or lack of impact of the optical beam onto said array sensor, and wherein the system sums for each time slot the number of pixels on said array sensor impacted by the beam, the impact of the beam onto a pixel being represented by a first data value and the absence of impact being represented by a second data value.

21. A method for tracking alignment using an optical communication system, comprising the steps of:

receiving an optical beam from a transmitting source by impacting the optical beam onto an array;

comparing a shape of the impacted image with a shape of the predetermined image by summing the pixels on said array which have been impacted by the beam, comparing the sum with a predetermined threshold number and recording the distribution of impacted pixels into a memory where the sum meets or exceeds the threshold number;

determining whether a deviation exists between the shapes of the respective images; and initiating corrective alignment based on a deviation between the shapes of the respective images.

22. The method of claim 21, wherein said summing step of said comparison step includes the initial step of recording digital values at the output of each individual pixel.

23. A method for tracking alignment using an optical communication system, comprising the steps of:

receiving an optical beam from a transmitting source by impacting the optical beam onto an array;

comparing a shape of the impacted image with a shape of the predetermined image by creating a projected image in the horizontal and vertical directions, and combining said horizontal and vertical images to create a composite image;

determining whether a deviation exists between the shapes of the respective images; and initiating corrective alignment based on a deviation between the shapes of the respective images.

* * * * *